Figure 1:
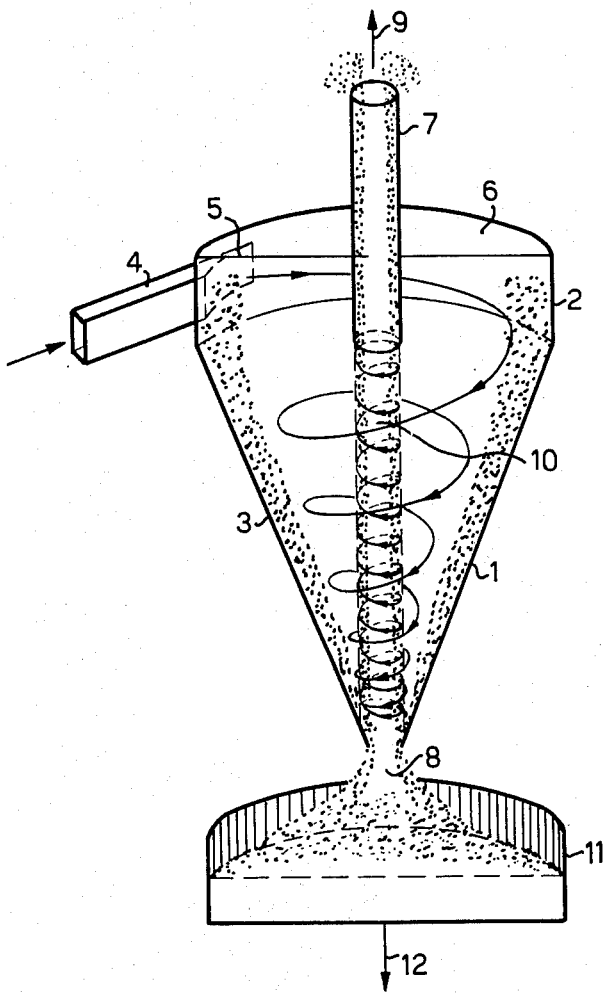

May 22, 1956  F. J. FONTEIN  2,746,604
PROCESS OF CLASSIFYING GRANULAR MIXTURES
Filed March 8, 1951  2 Sheets-Sheet 1

Inventor
Freerk J. Fontein
By Cushman, Darby & Cushman
Attorneys

United States Patent Office 2,746,604
Patented May 22, 1956

2,746,604

PROCESS OF CLASSIFYING GRANULAR MIXTURES

Freerk J. Fontein, Heerlen, Netherlands, assignor to Stamicarbon N. V., Heerlen, Netherlands Application March 8, 1951, Serial No. 214,503

Claims priority, application Belgium March 10, 1950

4 Claims. (Cl. 209—211)

This invention relates to classification. More particularly the invention relates to a process of classifying granular mixtures such as calcareous calcinable material and raw materials for the manufacture of cement, and to the classification of slurries, and especially ore slurries, such as are discharged from a grinding mill and that must be classified to return over-size solids to the mill for re-grinding.

In ore-processing it is often necessary to classify granular mixtures of mineral substances or to separate these mixtures into fractions according to particle sizes.

As a rule, coarse-grained mixtures are classified by screening whereas in the classification of fine-grained mixtures usually the difference in the settling rate in water of the coarser and finer particles is availed of by applying classifiers such as rake classifiers, bowl-classifiers or hydro-separators in which the coarser particles settle, the finer ones being entrained by the water towards the overflow.

Classifiers require a considerable amount of water and the fraction of fine particles, discharged through the overflow, has a high water content. This is the reason why in many cases this dilute fraction must be thickened. For instance, if the original product is moist, it must first be diluted with water and then, after classification, the dilute fraction must be thickened. When operating in this manner, the amount of work is doubled but no better method has been available.

In the manufacture of cement for instance, first a mixture must be prepared of the raw materials, such as limestone or shells and schist, which contains few particles bigger than 60 microns, which mixture must be burned. This is effected by the following processes in which the mixing of the various raw materials can be carried out either before or after grinding:

1. *Dry method.*—The raw materials are dried and subsequently ground by means of (ball) mills and air separators in a closed circuit. This means that the crushed product is supplied to an air separator where it is classified and that the coarse fraction is returned from the air-separator to the mill, whereas the fine fraction obtained from the air separator is of a sufficient fineness.

2. *Wet method with thick slurry.*—The raw materials are diluted with such an amount of water that a slurry is obtained which can be crushed and conducted to the kiln.

3. *Wet method with thin slurry.*—The raw materials are diluted with such an amount of water as is needed to classify them by means of rake or bowl classifiers in a closed circuit with (ball) mills. Sometimes grinding is effected either in one stage or in more stages arranged in series.

In the application of method 1, a drying-plant is required and this method is particularly unfavourable when clay is used as a raw material, on account of the fact that clay can far better be disintegrated with water.

Method 2, in which no classification is applied, requires a high grinding capacity because the particles which are already smaller than 60 microns must be passed through the mill together with the coarse material. Consequently, this method has the drawback of high grinding expenses.

In method 3, more water is added than in method 2 because the classifiers are not capable of classifying the viscous slurry of method 2. This is not surprising as the solids in a thick slurry are not free settling, but are in effect in compression since the range of movement of each suspended solid is substantially restricted by its adjacent and contiguous neighbor solids.

With prior classification processes therefore the overflow fraction contains approximately a maximum of 25% by volume of solids at a size of separation of 28 mesh and approximately a maximum of only 8% by volume of solids at a size of separation of 200 mesh. Thus method 3 is open to the objection that the thin slurry must be thickened prior to burning so that a costly thickener is required.

It will be clear that none of these methods gives entire satisfaction and this is the reason why for a long time attempts have been made to find a satisfactory solution for classifying the thick slurry of method 2 and for classifying viscous granular mixtures in general. These attempts are particularly directed to a method in which the classified fractions contain so little water that thickening may be dispensed with. It stands to reason that the consistency of the suspension must always be such that the suspension can be handled in a suitable manner or in other words the suspension will always have to be pumpable.

A pumpable slurry contains approximately 50% by volume of solids when the solids are completely dispersed. With incomplete dispersion the content of solids is lower than 50% and may vary considerably, depending upon the degree of dispersion.

It is the object of this invention to provide a method for the classification of granular mixtures in a thick slurry. It is particularly the object of this invention to provide a method for the classification of a thick slurry containing calcareous, calcinable material, such as limestone and shells and for the classification of other raw materials for the manufacture of cement. It is a further object of this invention to provide a method for manufacturing cement. It is another object of this invention to provide a method and apparatus for grinding and classifying solids in closed circuit.

According to the invention the granular mixture to be classified is immersed in sufficient liquid to form a slurry of the solids whose flowability is enough to make the slurry pumpable. This thick slurry is then fed into a hydrocyclone the operation of which is controlled to effect classification therein.

By the term hydrocyclone is meant a chamber or space comprising a cylindrical portion closed at one end by a wall with its other end joined to the larger and open end of a co-axial conical portion. Thus, the closed end of the cylindrical portion forms the base wall of a generally cylindrical chamber. All interior surfaces are smooth. A tube or vortex finder extends axially through the base wall and terminates within the cylindrical portion or closely adjacent thereto, and the apex of the conical portion is apertured, these two apertures forming outlets. Material is delivered to the interior of the hydrocyclone through an aperture opening tangentially of the cylindrical portion. Except for the vortex finder, the interior of the chamber is unobstructed. A hydrocyclone of this type has been described in U. S. Patent 2,534,702.

By pressure feeding a thin suspension continuously into a hydrocyclone the suspension flows at a high velocity through the tangential feed entrance into the space and fills it with a body of suspension swirling around the axis of said space. Thereby two concentrical vortices are established, viz. an outer one which has an axial flow component towards the apex of the hydrocyclone and an inner one moving axially towards the vortex finder. Particles with a fast settling rate are centrifuged towards the outer vortex and are discharged through the apex of the hydrocyclone, whereas slower settling particles move into the inner vortex and are discharged through the vortex finder. This operation has been described in more detail in my co-pending application Serial Number 87,076 filed on April 12, 1949, now Patent No. 2,700,468.

As the centrifugal force is directly proportional to the square of the velocity and inversely proportional to the radius, the centrifugal force is significantly larger near the central axis of a hydrocyclone than near its periphery, because the rotating liquid near the axis has a larger velocity as well as a smaller radius. Classification therefore is best near the axis of a hydrocyclone.

As the velocity of rotation increase towards the centre of a hydrocyclone, liquid near the axis has a much larger angular velocity than liquid near the periphery. Thus an outer liquid film tends to slow down the velocity of its adjacent inner liquid film. With low viscosity suspensions such as can be classified also by classifiers of other types, this retardation is of minor importance as follows from the flow pattern described above and actually occurring in hydrocyclones classifying low-viscosity suspensions.

With high-viscosity pumpable slurries this retardation has heretofore prevented the establishment of the flow-pattern required for classification. I have found, however, that by introducing a pumpable slurry into a hydrocyclone at a feed pressure which is significantly in excess of the feed pressures used for the classification of low-viscosity slurries, the proper flow-pattern for classification can be established in a hydrocyclone.

Thus by operating a hydrocyclone in the proper way it is possible to classify high-consistency slurries which heretofore could not be classified due to the crowded condition of the solids therein. This invention is particularly useful for the classification of cement-slurry and for classification in closed circuit with a grinding mill.

Figure 2:
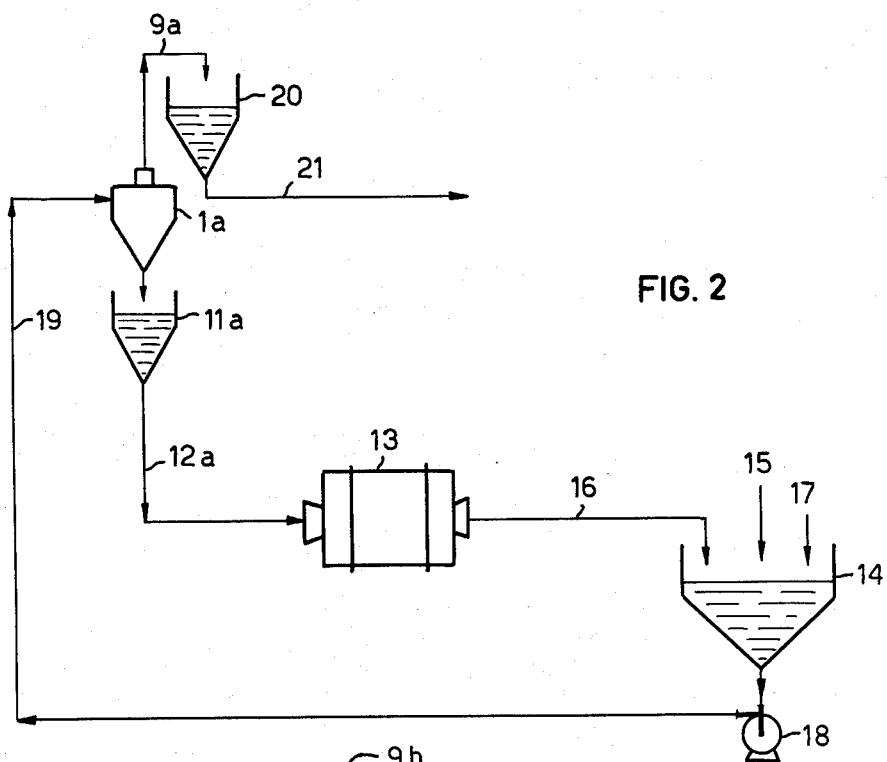
Figure 3:
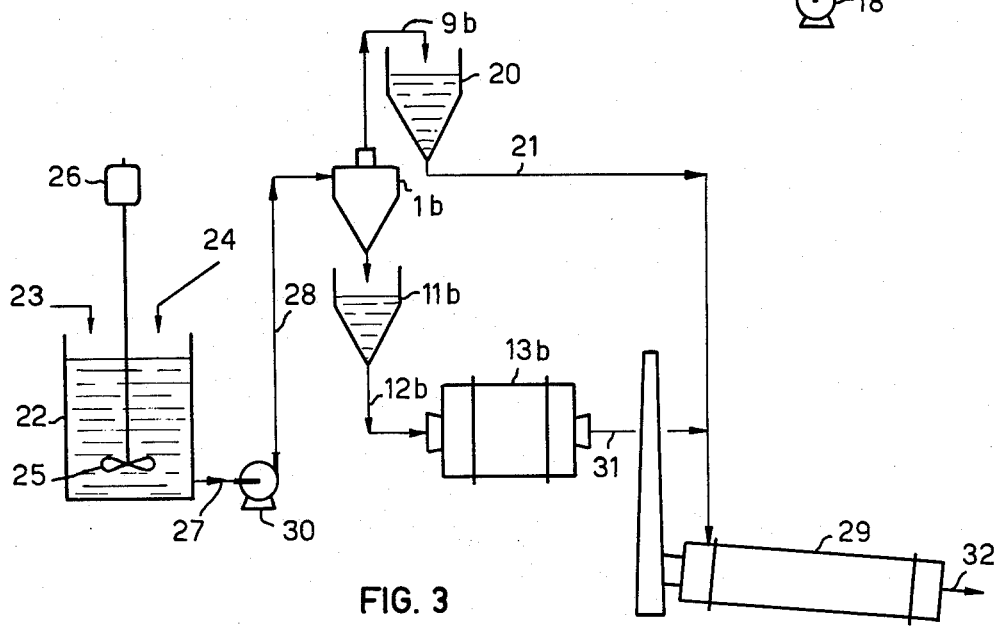

The invention has been illustrated in the accompanying drawings, wherein Fig. 1 is an idealistic drawing of a hydrocyclone, showing the course taken by the particles in the apparatus; Fig. 2 represents a grinding mill and a hydrocyclone in closed circuit and Fig. 3 represents part of a cement factory.

More in particular Fig. 1 shows a hydrocyclone 1 which comprises a cylindrical portion 2 and a conical portion 3, a feed duct 4 which at feed aperture 5 opens tangentially into cylindrical section 2. The cylindrical section 2 is closed by a cover plate or base plate 6 which is provided with a central and axial discharge pipe or vortex finder 7. The conical portion 3 is provided with an apex aperture 8. Material enters the cylindrical portion 2 tangentially through feed aperture 5 at high velocity so as to create a swirling motion in the cylindrical portion 2. To assist the swirling motion and to prevent short-circuiting of the material upwardly through the base plate 6, the vortex finder 7 projects downwardly into the hydrocyclone to a point below feed aperture 5.

After the material has started swirling at great speed in cylindrical portion 2 it passes downwardly and inwardly through conical portion 3 and in so descending it swirls in ever-decreasing circular paths at over-increasing velocity. The forces created by this swirling motion cause an internal classification within the hydrocyclone such that the larger and heavier particles are thrown into a zone which will be located nearest the smooth periphery of the hydrocyclone and the smaller and lighter particles are concentrated in a zone which is concentric with that of the coarse particles but which is located nearer to the center of the hydrocyclone. As these materials reach the apex aperture 8, the finer materials in the centre of the hydrocyclone then turn upwardly and still in the same directional swirling motion pass upwardly and out of the hydrocyclone through vortex finder 7 to be discharged through line 9. In the centre of this ascending column of fines there will be located an air core 10. The coarse material is discharged through apex aperture 8 and passes from the apex as an annular spray which is received in collecting vessel 11 and further removed through line 12.

Figure 2 shows a grinding mill 13 and a hydrocyclone 1a in closed circuit; 14 is a container receiving ore through line 15 and the discharge from mill 13 through line 16, enough water being added through line 17 to form a pumpable slurry which is pumped by pump 18 through line 19 to hydrocyclone 1a. The apex discharge from hydrocyclone 1a is received in collecting vessel 11a and fed through line 12a to mill 13 for re-grinding. The vortex finder discharge from hydrocyclone 1a is received in collecting vessel 20 through line 9a and discharged through line 21.

In Figure 3 only one unit has been shown of the various types of apparatus although several units are used.

22 is a mixer in which the raw materials introduced through line 23 are mixed with water introduced through line 24 by means of an agitator 25 which is actuated by a motor 26.

30 is a pump which receives the slurry from the mixer 22 through a pipe 27 and which pumps the slurry towards hydrocyclone 16b through a closed conduit 28. The fine fraction leaves the hydrocyclone through line 9b and is conducted to a kiln 29 by means of a collecting vessel 20 and a pipe 21. The coarse fraction from the hydrocyclone is gathered in collecting tank 11b and passes through line 12b towards a ball mill 13b where it is ground, the ground product being conducted to the kiln 29 through a line 31 together with the fine fraction which has been supplied through line 21 in order to be burned to cement clinker 32.

*Example 1*

A sandy clay is classified in a hydrocyclone of the following dimensions:

Diameter of cylindrical portion 2 _____mm__ 60
Height of cylindrical portion 2 _____mm__ 25
Cone angle of conical portion 3 _____deg__ 20
Cross-sectional area of feed duct 4 _sq. mm__ 10.6 x 10.6
Diameter of vortex finder 7 _____mm__ 24
Length of vortex finder 7 inside cylindrical portion 2 _____mm__ 24
Diameter of apex aperture 8 _____mm__ 9

The sandy clay is mixed with water to form a slurry containing 39.4% by weight of solids. On account of incomplete dispersion of the clay which is present in large quantity, this slurry is just pumpable. This slurry is introduced continuously at a feed pressure of 4 kilograms per square centimeter into the hydrocyclone.

The apex discharge amounts to 0.6 cubic meter per hour with a content of 57.7% by weight of solids, 60% of the solids being coarser than 60 microns. The vortex finder discharge amounts to 5.07 cubic meters per hour with a content of 33.0% by weight of solids, 97.6% of the solids being finer than 60 microns.

*Example 2*

In a cement factory as shown in Fig. 3 use is made of a hydrocyclone of the following dimensions:

Diameter of cylindrical portion 2 _____mm__ 122
Height of cylindrical portion 2 _____mm__ 30
Cone angle of conical portion 3 _____deg__ 20
Cross-sectional area of feed duct 4 ____sq. mm__ 16 x 16
Diameter of vortex finder 7 _____mm__ 36
Length of vortex finder 7 inside cylindrical portion 2 _____mm__ 25
Diameter of apex aperture 8 _____mm__ 13

In the mixer 22 the raw materials are mixed with such an amount of water as is needed to obtain a pumpable slurry. This slurry contains 63.1 per cent by weight (or 40% by volume) of solid matter; its viscosity has been determined with a pendulum viscosimeter (see Chemisch Weekblad, December 31, 1949, page 861) by means of which ¾ oscillation has been measured which corresponds with a viscosity of about 600 centipoises. (For the purpose of comparison it should be stated here that the viscosity of glycerol at 30 centigrade is 624 centipoises.) When the paste has been properly mixed, it is pumped towards the hydrocyclone 16 by the pump 30 and enters the feed aperture 5 at a pressure of 4 kg./cm.² above atmospheric. Consequently, the slurry has a fast rotary movement so that the coarse particles are driven outwardly towards the inner wall of the hydrocyclone 1b and subsequently leave the hydrocyclone through the apex aperture 8, whereas the majority of the fine particles are carried off through the vortex finder 7. Every hour 12.2 m.³ slurry may be treated in the hydrocyclone and separated into a coarse fraction of 2.9 m.³ and a fine fraction of 9.3 m.³. The fine fraction contains 61.7 per cent by weight of solid matter and can be used for the manufacture of cement; the coarse fraction must first be ground in the ball mill 13b whereafter the two fractions are united and burned in the kiln 29.

The particle size distribution of the various fractions is as follows:

| Screen | Percent by weight of solid matter on the screen | | |
|---|---|---|---|
| | feed (at 4) | fine fraction (at 20) | ground fraction (at 31) |
| mesh: | | | |
| 250 | 10.4 | 4.8 | 5.9 |
| 115 | 5.3 | 1.0 | 1.3 |
| 42 | 4.8 | 0.0 | 0.0 |

Attention is drawn to the fact that the fine fraction at 20 contains a lower percentage of coarse particles than the ground fraction at 31.

When a hydrocyclone is inserted in the grinding circuit, the feed of the kiln is consequently of a finer particle size than in the case where all material is crushed. The greatest advantage of the present invention, however, is that by using the hydrocyclone the crushing capacity has been reduced to 24%, and so lowered by 76%, without the application of a thickener being required.

The feed pressure of 4 kilograms per square centimeter is the lowest at which the slurries of the two examples can be classified. I have tried a feed pressure of 3 kilograms per square centimeter for the slurry of Example 2 but at that pressure substantially no classification took place, the two separated fractions being nearly identical but for a larger percentage of solids larger than 1 mm. in the apex fraction. With a thin slurry, however, a feed pressure of 0.5 kilogram per square centimeter is sufficient to effect a size of separation of 350 mesh, using the same hydrocyclone.

Thus it is evident that for the classification of a high viscosity thick slurry a hydrocyclone must be operated at a feed pressure which is significantly in excess of the feed pressure required when classifying low viscosity slurries.

The invention is also applicable to other materials than those mentioned herein.

For classification of particles with slower settling rates such as particles smaller than 60 microns, a hydrocyclone of a smaller diameter and with smaller apertures should be used or a higher infeed pressure should be employed. Coarser particles or particles with a higher specific gravity than limestone may be classified at a lower feed pressure and in a larger hydrocyclone. The size of separation may further be increased by increasing the diameter of the vortex finder in relation to the diameter of the apex aperture.

The terminology employed in the specification is for the purpose of description and not for limitation; the scope of the invention being indicated in the claims.

I claim:

1. The continuous process of classifying mixtures of cement making solids, which comprises mixing such mixtures with sufficient water only to make a pumpable slurry suitable for introduction directly into a kiln, establishing and maintaining a body of such slurry in a hollow generally conical space of decreasing diameter that is confined by a closed and smooth surface of revolution near its wide end with an axial outlet at its apex and another axial outlet at its wide end, force-feeding such pumpable slurry into the confined body tangentially at its widest part for establishing and maintaining two concentric vortices in the body rotating in the same direction about the axis of the body but with opposed flow components with the inner vortex rotating more rapidly than the outer vortex, discharging faster settling solids from the outer vortex through the apex outlet while discharging slower settling solids through the other outlet, and feeding the slurry to the body with a controlled pressure not less than about four kilograms per square centimeter to develop centrifugal force and concomitant centripetal flow each significantly sufficiently in excess of the force of gravity for assuring settling of the suspended solids in accordance with their relative settling rates in spite of their crowded condition due to their high concentration at kiln-using consistency.

2. The continuous process of classifying mixtures of cement making solids ground in a mill at high concentration by usual methods that produce a mill discharge of solids ground to a fineness both above and below a predetermined fineness, which comprises mixing such mill discharge with sufficient water only to make a pumpable slurry suitable for introduction directly into a kiln, establishing and maintaining a body of such slurry in a hollow generally conical space of decreasing diameter that is confined by a closed and smooth surface of revolution near its wide end with an axial outlet at its apex and another axial outlet at its wide end, force-feeding such pumpable slurry into the confined body tangentially at its widest part for establishing and maintaining two concentric vortices in the body rotating in the same direction about the axis of the body but with opposed flow components with the inner vortex rotating more rapidly than the outer vortex, discharging faster settling solids from the outer vortex through the apex outlet while discharging slower settling solids through the other outlet, and feeding the slurry to the body with a controlled pressure not less than about four kilograms per square centimeter to develop centrifugal force and concomitant centripetal flow each significantly sufficiently in excess of the force of gravity for assuring settling of the suspended solids in accordance with their relative settling rates in spite of their crowded condition due to their high concentration at kiln-using consistency.

3. A process of manufacturing cement wherein the raw materials are classified according to claim 1; the faster settling solids leaving said space through the apex are crushed; the crushings are mixed with the slower settling solids leaving said space through said vortex finder and burning said mix to clinker.

4. A process of manufacturing cement wherein the raw materials are classified according to claim 1; the faster settling solids leaving said space through the apex are crushed; the crushings are mixed with the raw material feed and returned to be further classified according to claim 1; and the slower settling solids leaving said space through said vortex finder are burned to clinker.

(References on following page)

References Cited in the file of this patent

UNITED STATES PATENTS

| | | |
|---|---|---|
| 2,104,709 | Weinig | Jan. 4, 1938 |
| 2,424,746 | Downes | July 29, 1947 |
| 2,648,433 | Wright et al | Aug. 11, 1953 |

OTHER REFERENCES

The Institute of Fuel, August 1939, page 336, "Cleaning of Coal by Heavy Liquids," by Duissen.

The Institute of Fuel, August 1939, pg. 349, "Cleaning of Coal by Heavy Liquids," by M. G. Driessen.

The Institute of Fuel, December 1945, pp. 33–45, "The Use of Centrifugal Force," by M. G. Driessen.